United States Patent [19]
Hudson

[11] 3,893,475
[45] July 8, 1975

[54] FLOAT VALVE

[76] Inventor: George D. Hudson, 120 Hobbs Cir., Santa Paula, Calif. 93060

[22] Filed: Oct. 5, 1973

[21] Appl. No.: 403,814

[52] U.S. Cl. ............... 137/414; 137/426; 137/428; 137/433; 137/444; 251/46
[51] Int. Cl. ........................................... F16k 31/18
[58] Field of Search .......... 137/412, 413, 403, 414, 137/426, 421, 428, 429, 430, 431, 432, 433, 437, 442, 444; 251/45, 46; 73/322.5

[56] References Cited
UNITED STATES PATENTS

| | | | |
|---|---|---|---|
| 3,115,153 | 12/1963 | Delamater | 137/432 X |
| 3,135,287 | 6/1964 | Kepka et al. | 137/432 X |
| 3,525,354 | 8/1970 | Parrish | 137/429 X |

*Primary Examiner*—Martin P. Schwadron
*Assistant Examiner*—David R. Matthews
*Attorney, Agent, or Firm*—Paul A. Weilein

[57] ABSTRACT

A hood structure encloses the following: a main valve that controls a water inlet port; a control chamber that has a bleeder port and has a diaphragm to control the main valve; a float; and a pilot valve member unitary with the float to control the bleeder port and thereby control the pressure in the control chamber for actuation of the main valve. Water from the inlet port bypasses the control chamber and flows through the hood to flush the float and the hood interior. Water from the inlet port passes through a screen to enter the control chamber in the form of a jet that flushes both the bleeder port and the pilot valve member. In addition, the pilot valve member is cleaned by a wiping action. Air trapped in the hood structure retards the rise of the float to modify the float cycle and an adjustable vent for the trapped air regulates the modifying effect of the trapped air.

20 Claims, 4 Drawing Figures

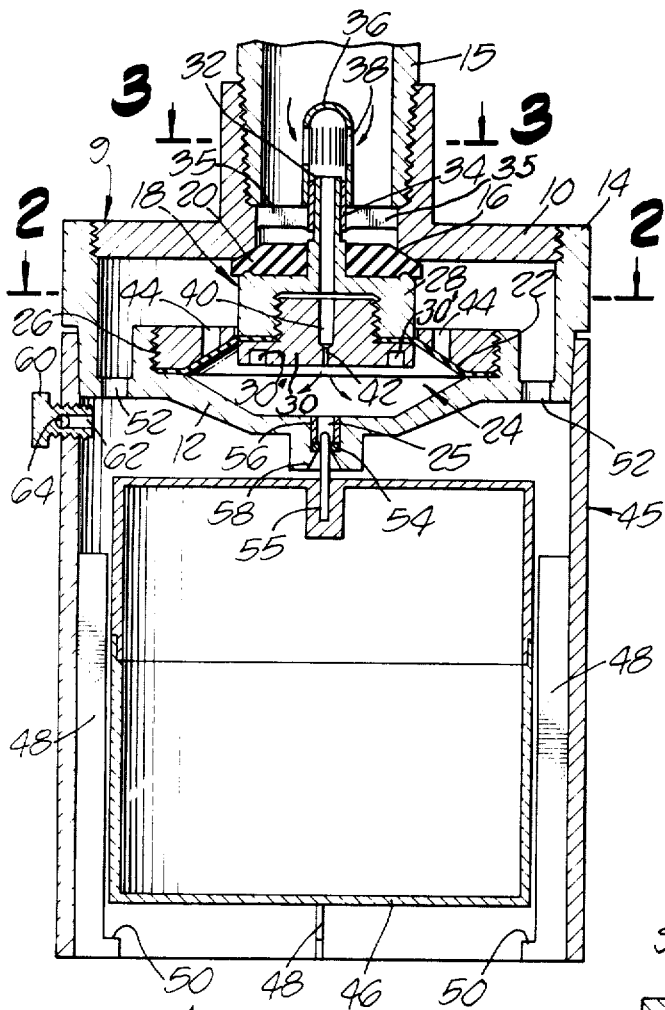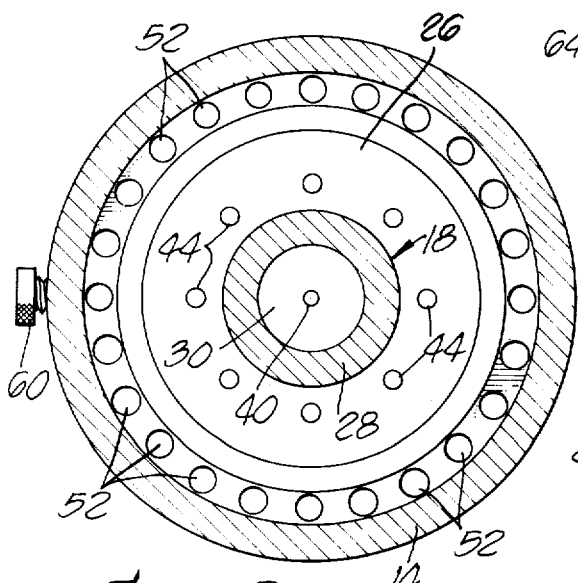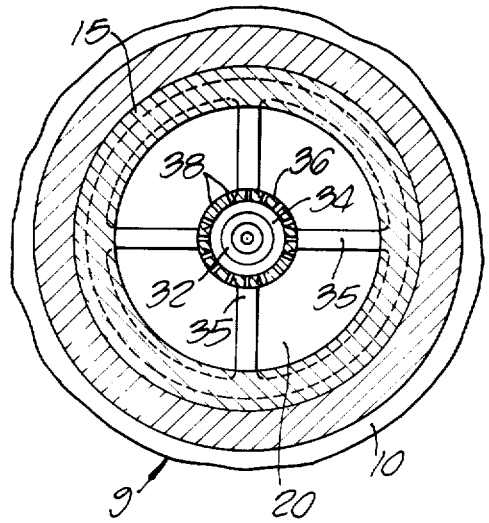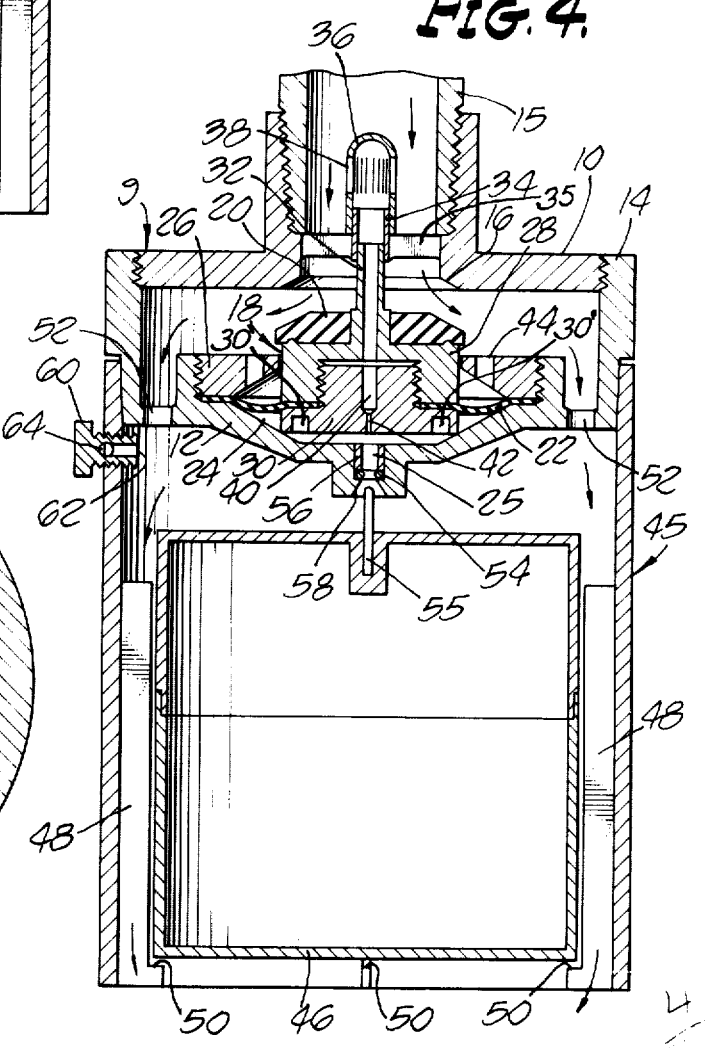

3,893,475

FLOAT VALVE

BACKGROUND OF THE INVENTION

A relatively early patent in the float valve art is the Noteboom U.S. Pat. No. 783,068 which issued in 1905. The patent shows a watering trough equipped with a float which is guided vertically by a surrounding float cage. When the water in the watering trough rises to a desired level, a valve disc on the upper side of the float closes against the downwardly extending end of an inlet pipe. The bouyancy force created by the float is relied upon to oppose the pressure of the water source but the bouyancy force is of relatively low magnitude compared to the force created by a normal sized pipe of relatively low pressure even though the float is of an unusually large size. Such a float operates satisfactorily when the pressure of the source is relatively low, for example, where the water source is a spring elevated a few feet above the float valve. Such a float valve, however, would not be operative against a source pressure of substantial magnitude, for example, 30 psi or greater.

To provide a float valve that is operative with a water source at substantially higher pressure, the concept has developed of providing a control chamber in communication with the high pressure source, the control chamber having a diaphragm to operate the inlet valve and having a bleeder port for the purpose of controlling the pressure in the control chamber. The float controls the inlet valve by operating a pilot valve that controls the bleeder port. Such a float valve equipped with a control chamber is exemplified by the Samiran U.S. Pat. No. 3,491,521 which issued in 1949 and the Russell U.S. Pat. No. 2,781,772 which issued in 1957. In both of these more recent disclosures a coil spring confined in the control chamber boosts the valve-closing action of the diaphragm and since such a spring is constantly exposed to the deteriorating effect of the liquid from the source, the spring may break in the course of time to interfere with the desired freedom of the control chamber to expand and contract. In both disclosures the float is mounted on a force-multiplying lever which is subject to deterioration especially in the region of the lever pivot and, of course, mechanical failure of the lever makes the float valve inoperative.

SUMMARY OF THE INVENTION

One object of the invention is to provide a rugged, reliable float valve that is of the general character disclosed in the Samiran and Russell patents and is capable of a prolonged troublefree service life. To this end, certain more specific objects characterize the invention. One of the specific objects is to simplify the float valve mechanism by reducing the number of working parts. The invention teaches that the ratio between the effective area of the diaphragm and the effective area of the valve seat of the inlet port may be high enough to eliminate the need for a booster spring in the control chamber. A ratio of at least 1.5 is satisfactory and in the preferred practice of the invention the ratio is approximately 2.5.

Another object of the invention is to provide a float valve that will operate efficiently over a wide range of pressures of the water source, for example, from a source pressure as low as 5 psi to a source pressure of 100 psi or higher. In this regard, a feature of the invention is that the omission of the booster spring in the control chamber facilitates attainment of this object.

The invention further teaches that the ratio between the bouyancy force of the float and the opposing force acting on the pilot valve may be high enough to permit elimination of the usual float lever. It has been found, for example, that a float with a bouyancy of 10 ounces is adequate to close a 1/16 inch diameter valve against a pressure of 100 psi. This will permit the pilot valve member to be fixedly mounted on the float with the float free to follow a vertical path aligned with the bleeder port. Also, in case of extremely low pressure the float must be heavy enough to open the pilot valve without the aid of pressure on the end of the valve member. The invention teaches that a weight of 3 ounces is sufficient. In the Samiran disclosure the float lever amplifies the bouyancy force of the float to a magnitude that would be sufficient to operate a pilot valve. In the Russell disclosure the float lever amplifies the bouyancy force of the float to a magnitude that is sufficient to operate the pilot valve. The present invention teaches that the same closing force can be obtained without using a lever to amplify the bouyancy force of the float.

Another of the specific objects of the invention is to avoid any malfunctioning of the float valve that might be caused by clogging of the small pilot valve that controls the bleeder port to control the pressure in the control chamber. The preferred practice of the invention provides a number of specific features for this purpose of avoiding clogging of the pilot valve. One of the specific features is a screen to prevent entry of foreign particles into the control chamber. Another specific feature is the provision of a jet stream inside the control chamber in alignment with the bleeder port of the control chamber and the associated pilot valve member.

Still another specific feature is the provision of wiping action between the pilot valve seat at the bleeder port and the pilot valve member on the float. For this purpose the pilot valve seat is in the form of a resilient O-ring and the pilot valve member on the float is in the form of a pin that is forced into the O-ring by the rise of the float. A further specific feature to prevent clogging of the pilot valve is the diversion of the flow from the main inlet port into the region of the pilot valve member on the float to flush the pilot valve member in the course of each operating cycle of the float valve. This diversion of the inflow stream also flushes the float valve itself as well as the cooperating guide means for confining the float valve to a vertical path.

A special feature of the invention is the concept of trapping a body of air in the path of ascent of the float to modify the behavior of the float. For this purpose the hood that encloses and guides the float is constructed and arranged to trap a body of air on each cycle of operation of the float valve. The trapped air opposes the rise of the liquid level inside the hood and thus causes the rise in liquid level inside the hood to lag behind the rise in liquid level outside the hood. The liquid level outside the hood must rise enough above the liquid level inside the hood to compress the trapped air sufficiently to permit the float to rise high enough to close the pilot valve. It is apparent that the trapped air has the effect of raising the normal level in the tank that is supplied by the float valve.

The invention further teaches that the hood may be provided with an adjustable vent for the trapped air which vent may be adjusted to modify the operation of the float valve in a desirable manner. For example, if the vent is adjusted to release the trapped air within a given short time period after the pilot valve closes, the opposition of the trapped air to rise of the liquid level inside the hood dissipates in the given time interval with the result that the float rises by an additional increment in the given time interval. One result is a mutual wiping action between the O-ring of the bleeder port and the pin on the float as the release of trapped air permits the additional advance of the pin. Another result is that the float valve closes when the liquid level in the tank rises to some given level but does not open until the liquid level falls to a second level which may be substantially below the given level. In effect, the temporary entrapment of air in the hood permits a certain lost motion in that the float is given an additional range of upward movement after the pilot valve closes and the float must retreat through this additional range before the float valve opens. The delayed response of the pilot valve to the drop in water level in the tank reduces the frequency with which the float valve is required to operate to release a given total volume of liquid over a given period of time and, of course, reducing the frequency of the operating cycle of the float valve prolongs the service life of the float valve.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a vertical sectional view of the presently preferred embodiment of the invention with the float valve closed;

FIG. 2 is a horizontal sectional view as seen along the line 2—2 of FIG. 1;

FIG. 3 is an enlarged horizontal section taken as indicated by the line 3—3 of FIG. 1; and FIG. 4 is a view similar to FIG. 1 showing the float valve in open position.

DESCRIPTION OF THE PREFERRED EMBODIMENT OF THE INVENTION

The illustrated embodiment of the invention includes a cylindrical valve casing, generally designated 9, having a top wall 10, a bottom wall 12 and a cylindrical peripheral wall 14. The top wall 10 is connected to a supply pipe 15 that provides a supply port that forms an annular valve seat 16 for cooperation with a main valve member, generally designated 18, that is provided with an elastomeric facing 20. The main valve member 18 is shown in closed position against the valve seat 16 in FIG. 1 and is shown in open position in FIG. 4.

The main valve member 18 is carried by a diaphragm 22 having a movable wall portion, and is substantially 1½ times the area of the interior of the supply pipe 15. The diaphragm is a movable wall of a control chamber 24 that has a bleeder port 25 in the bottom wall 12. In the construction shown the diaphragm 22 is ring-shaped with its outer circumferential margin secured by a bushing 26 and with its inner circumferential margin clamped between an upper section 28 and a lower section 30 of the main valve member 18, the two sections being threaded sections and section 30 having spaced recesses 30, 30' permitting the sections to be screwed together for clamping action on the diaphragm.

The main valve member 18 is formed with a tubular axial valve stem 32 that serves as an inlet passage for the control chamber 24 and is slidable in a sleeve portion 34 of a guide spider 35. The sleeve portion 34 of the guide spider is provided with a cap 36 that serves as a screen to stop foreign particles and for this purpose is provided with a circumferential series of slits 38 which are shown in section in FIG. 3. The main valve member 18 has an axial passage 40 that places the inlet pipe 15 in communication with the control chamber 24 and the lower end of this passage is restricted to form a jet nozzle 42 that is concentric to the bleeder port 25 of the control chamber. The bushing 26 that clamps the diaphragm 22 is formed with a plurality of bores 44 to eliminate suction and compression from the back side of the diaphragm.

The bottom wall 12 of the cylindrical valve casing 9 constitutes the upper end wall of a downwardly extending cylindrical hood 45 that is open at its bottom and confines a freely movable cylindrical float 46. The float 46 is guided in a vertical path by a plurality of spaced guide ribs 48 that define vertical passges for water flow past the float. The guide ribs 48 form lower stop shoulders 50 that limit the downward movement of the float 46. Water flow from the inlet pipe 15 bypasses the control chamber 24 and for this purpose the bottom wall 12 of the valve casing 9 is provided with a circumferential series of bores 52 which have a combined area substantially equal to the interior area of the inlet pipe 15 and direct the inlet water into the region of the float 46.

A pilot valve operated by the float controls the bleeder port 25 and thereby controls the opening and closing movement of the main valve member 18. In the preferred embodiment of the invention the pilot valve comprises a small O-ring 54 in the bleeder port 25 and a valve member in the form of a pin 55, the O-ring being retained in the bleeder port 25 by means of a retainer sleeve 56 and the pin 55 being rigidly mounted on the float 46. The guide ribs 48 confine the movements of the float to a path that is in axial alignment with the bleeder port 25 and the pin 55 is also in axial alignment with the bleeder port. Preferably, the entrance to the bleeder port 25 is bevelled as indicated at 58.

In the preferred practice of the invention the hood 45 is constructed and arranged in the manner indicated in FIG. 1 for the purpose of trapping a body of air in the upper end of the hood on each operating cycle to modify the behavior of the float 46, but it is to be understood that in some embodiments of the invention no provision is made for trapping air.

A feature of the invention is the provision of an adjustable vent that may be closed to prevent the release of the confined air or may be slightly open for gradual release of the confined air or may be wide open to prevent trapping of air in the path of the float. In the construction shown the vent is in the form of a knurled thumb screw 60 that is mounted in a threaded bore in the cylndrical wall of the hood 54. A blind axial bore 62 is formed in the leading or inner end of the thumb screw in communication with a radial bore 64 in the thumb screw. It is apparent that the thumb screw 60 may be tightened to prevent escape of any air from the interior of the hood 45, or may be partially loosened for retarded leakage of air form the hood, or may be loosened to fully expose the radial bore 64 to prevent the entrapment of air.

If the thumb screw 60 is loosened for free flow of air into and out of the hood 45, the float 46 behaves in the conventional manner, the float opening the pilot valve when the water level outside the hood drops to a given level and the float closing the pilot valve when the outside water level reaches the same given level. Since no air is trapped in the hood the water level in the hood always corresponds to the water level outside the hood.

If the thumb screw is tightened to prevent the release of the trapped air the rise of the water level inside the hood lags behind the rise in the water level outside the hood because the water and the float inside the hood must compress the trapped air sufficiently to permit the float to rise high enough to close the bleeder port 25. Consequently, the pilot valve opens and closes at a substantially higher given level of the outside water than would be the case if no air were trapped in the hood.

A feature of the invention is that the thumb screw 60 may be adjusted for such restriction of leakage of air from the hood that a substantial portion of air is trapped inside the hood when the pilot valve closes and after the pilot valve closes an appreciable period of time is required for the air pressure in the hood to be equalized with the atmosphere At such retarded leakage of air the water outside the hood must rise above the water level inside the hood to compress the trapped air sufficiently to permit the pilot valve to close inopposition to the pressure of the trapped air. after the pilot valve closes, however, the trapped air is gradually released with the consequence that the float rises beyond the point at which the pilot valve closes. Initially the float rises sufficiently in opposition to the trapped air to close the bleeder port 25 and thus cause the main valve member 18 to move to closed position but thereafter, as the pressure of the trapped air is gradually reduced, the float continues to rise and the pin 55 moves farther into the interior of the control chamber 24. Later, when water consumption causes the water outside the hood 45 to drop in level, the float lowers to retract pin 55 for an appreciable distance without releasing water from the control chamber.

There are two results of releasing the trapped air in the described retarded manner. One result is the wiping action between the O-ring 54 and the pin 55 and the other result is that the water outside the hood must rise to a relatively high level to close the main valve but subsequently must drop to an appreciably lower level to cause the main valve to open. With the main valve closing at a relatively high water level and opening at a relatively low water level a greater quantity of water is released from the inlet pipe 15 on each float cycle and consequently the frequency of the float cycle is reduced for a given water demand. Obviously, reducing the frequency of the float cycle increases the service life of the float valve mechanism.

It will also be appreciated that the restricted air passage in the hood structure operates to retard the downward motion of the float by creating a partial vacuum which causes the float to lag behind the fall of water outside the hood structure.

It is to be noted that actually there are only two movable parts, namely, the float 46 with the pin 55 attached thereto and the diaphragm 22 with the main valve member 18 attached thereto.

Three provisions work together to minimize any tendency for the bleeder port 25 to become clogged. One provision is the screening of the water that enters the control chamber to prevent solid particles from reaching the bleeder valve. The second provision is the jet nozzle 42 which produces a jet stream that is highly effective for flushing out the bleeder port 25 and for flushing the pin 55 not only when the pin extends through the O-ring 54 but also when the pin is retracted from the O-ring. The third provision is the wiping action between the pin 55 and the O-ring 54. The wiping action occurs in the absence of trapped air but, as previously explained, is increased when the trapped air leaks out of the hood at a retarded rate.

The jet stream also helps to purge the control chamber 24 of water when the bleeder port 25 is open. The bleeder port being of a larger size than the jet stream helps to pull the main valve to a wide open position by sucking the entrapped water with it.

It is also to be noted that the interior of the hood 45 and the surfaces of the guide ribs 48 are flushed by the streams of water issuing from the bores 52 at the upper end of the hood. The flushing action of the water released by the bores 52 is also effective in the region of the pilot valve pin 55 when the float 46 drops with the lowering of the water level.

The above description of the presently preferred embodiment of the invention will suggest various changes, substitutions, and other departures from the disclosure within the spirit and scope of the appended claims.

I claim:

1. In a float valve for replenishing a body of liquid from a pressurized liquid source in response to drop in the level of the liquid body, wherein a control chamber is in communication with the pressurized source and has a movable wall to exert pressure to close a main valve to cut off the source from the liquid body and a pilot valve operated by a float opens and closes a bleeder port of the control chamber, the improvement comprising:
said pilot valve including a pilot valve member to open and close the bleeder port, said pilot valve member being fixedly mounted on the float and movable therewith to engage or disengage a seat around said bleeder port to thereby close or open the bleeder port in response to rise and fall of the float.

2. An improvement as set forth in claim 1 which includes means to confine the float to a path of movement in which the pilot valve member moves in alignment with the axis of the bleeder port.

3. An improvement as set forth in claim 2 in which the float has an adequate bouyancy force to actuate the pilot valve to close the bleeder port effectively without employing leverage to multiply the closing force by the float.

4. An improvement as set forth in claim 1 in which said pilot valve member is a pin mounted on the float and extending from the float in the direction of travel of the float.

5. An improvement as set forth in claim 1
which includes means to confine the float to a path
in alignment with the axis of the bleeder port;
in which the pilot valve member is a pin mounted on the float in alignment with the bleeder port;

and in which the bleeder port is provided with a ring-shaped elastomer valve seat for cooperation with the pin.

6. An improvement as set forth in claim 5 in which said elastomer valve seat is dimensioned to embrace the pin at the closed position of the pilot valve.

7. A combination as set forth in claim 6 which includes means to cause the pin to continue to advance relative to the elastomer valve seat after the pin cuts off flow through the valve seat thereby to cause wiping action between the elastomer valve seat and the pin.

8. An improvement as set forth in claim 1 which includes a hood enclosing and guiding the float with clearance space between the float and the surrounding hood;
and which includes means bypassing the control chamber to direct the discharge from the main valve into the hood and through said clearance space to flush the float and the inner surfaces of the hood.

9. A combination as set forth in claim 8 in which the hood is provided with a plurality of spaced ribs to guide the float.

10. An improvement as set forth in claim 8 in which the hood is constructed and arranged to trap a body of air to oppose the rise of the float;
and in which the hood is provided with an adjustable vent to release the trapped air.

11. In a float valve for replenishing a body of liquid from a pressurized liquid source in response to drop in the level of the liquid body, wherein a float on the liquid body controls release from the source to the liquid body,
the improvement comprising:
a hood enclosing the float, said hood being constructed and arranged to trap a body of air to resist the rise of the float;
said hood being provided with an adjustable vent to release the trapped air at a retarded rate.

12. An improvement as set forth in claim 11 which includes means to direct the discharge from the main valve into the interior of the hood to flush the interior of the hood and the surfaces of the float.

13. In a float valve for replenishing a body of liquid from a pressurized liquid source in response to drop in the level of the liquid body, wherein a float on the liquid body controls a valve for releasing liquid from the source,
the improvement comprising:
a hood enclosing the float and a surrounding portion of the liquid body,
said hood being constructed and arranged to trap a body of air in the path of rise of the liquid level inside the hood, whereby the liquid inside the hood is required to compress the trapped air and therefore lags behind the rise of the liquid level outside the hood and the liquid level outside the hood rises higher than it would in the absence of the trapped air.

14. An improvement as set forth in claim 13 in which the float is free to rise through a range of levels above the level at which the float closes the valve;
and which includes means to vent the trapped air at a retarded rate after the float closes the valve thereby to permit the float to rise into said range whereby the float must retract through said range to open the valve with consequent reduction of the number of times that the valve must be opened to release a given total amount of liquid from said source over a given extended period of time.

15. An improvement as set forth in claim 14 which includes:
a control chamber in communication with the pressurized source, the control chamber having a movable wall to operate said valve,
the control chamber having a bleeder port to control the pressure in the control chamber;
a ring-shaped elastomer valve seat in said bleeder chamber;
and a pin on the float to enter said ring-shaped valve seat to close the bleeder port in response to rise of the float,
whereby said pin advances in said valve seat when the float enters said range of levels with consequent wiping action between the valve seat and the pin.

16. In a float valve for replenishing a body of liquid from a pressurized liquid source in response to drop in the level of the body of liquid, wherein a control chamber is in communication with the pressurized source and has a movable wall operatively connected to a main valve for releasing liquid from the source, the control chamber having a bleeder port and a float on said body of liquid opens and closes said bleeder port to open and close the main valve,
the improvement comprising:
a jet nozzle in said control chamber fed by said source,
said jet nozzle being smaller than said bleeder port to direct a liquid jet smaller than the bleeder port axially into the bleeder port to flush the bleeder port on each cycle of operation of the float.

17. An improvement as set forth in claim 16 in which said main valve includes a main valve member carried by said movable wall;
in which the main valve member has a stem;
which includes a fixed guide sleeve slidingly embracing the stem to guide the main valve member;
in which said stem is tubular to supply water from the source to said jet nozzle.

18. An improvement as set forth in claim 17 which includes screen means at the inlet end of said tubular stem to keep foreign particles from entering the control chamber.

19. An immprovement as set forth in claim 17 in which said bleeder port is provided with a ring-shaped elastomer valve seat;
and in which the float fixedly carries a pin in axial alignment with said valve seat to cooperate with the valve seat to close the bleeder port whereby said jet nozzle delivers a jet stream to flush the pin as well as the ring-shaped valve seat.

20. In a float valve for replenishing a body of liquid from a pressurized liquid source in response to drop in the level of the liquid body, wherein a supply passage from a pressurized liquid source terminates in a supply port and a control chamber is in communication with the supply passage and has a movable wall to exert pressure to close a main valve against the supply port to cut off the source from the liquid body and a pilot valve operated by the float opens and closes a bleeder port of the control chamber,
the improvement comprising:
conduit means providing communication between the control chamber and the supply passage, said conduit means extending through said main valve and said supply port and having its inlet end at a point of the supply passage spaced upstream from said port.

* * * * *